3,586,525
METHOD OF MANUFACTURING SYNTHETIC LEATHER
Ichiro Minobe and Takashi Suzuki, Osaka, Japan, assignors to The Toyo Rubber Industry Co., Ltd., Osaka, Japan
No Drawing. Continuation-in-part of abandoned application Ser. No. 559,334, June 21, 1966. This application Sept. 11, 1969, Ser. No. 857,235
Claims priority, application Japan, July 6, 1965, 40/40,740
Int. Cl. B44d 1/44; D06n 3/00
U.S. Cl. 117—63                                         8 Claims

ABSTRACT OF THE DISCLOSURE

Process for preparing synthetic leather by coating a fibrous substrate with a composition consisting of polyurethane-urea polymer solution, an inorganic compound such as light calcium carbonate, magnesium carbonate, fine particle clay, hydrous silicate and zinc oxide having a particle size of 40 m$\mu$–2$\mu$ as nuclei ingredient and from 2–6% by weight based on the polymer solvent of a liquid miscible with the polymer solvent but incapable of dissolving the polymer, coagulating the polymer and extracting the solvent from the resultant product.

---

This application is a continuation-in-part application of our copending application Ser. No. 559,334, filed June 21, 1966, now abandoned.

The present invention relates to a method of manufacturing highly vapor-permeable sheet material having very excellent strength and flexibility, and more particularly to a method of manufacturing a microporous film material useful as a leather material, especially synthetic leather.

BACKGROUND OF THE INVENTION

Syntheses of natural leather replacements have long been studied and attempted, and various types of synthetic leathers have been recently proposed.

Recently, there has been proposed a method of manufacturing synthetic leather by using as the microporous material a film prepared according to a process which comprises the following steps; i.e., impregnating or coating a fibrous substrate with a synthetic polymer solution, and subsequently treating the resulting substrate with a liquid which is a non-solvent for the synthetic polymer and substrate fiber and is miscible with solvents for the synthetic polymer, to cause the synthetic polymer to coagulate. In this case, in order to form highly vapor- and air-permeable materials or films of a high degree of homogeneity and micro-porosity, the so-called nucleation action, i.e., behavior where the synthetic polymer is introduced into the non-solvent from its solution and coagulates, is very important.

The present invention provides an improved method for obtaining a homogeneous nucleation action.

Therefore, one of the objects of the invention is to provide a homogeneous and a microporous material or film exhibiting high vapor- and air-permeability.

Another object is to provide a material or film having a leather-like feeling and flexibility.

Other objects will be apparent from the description of the invention which follows.

SUMMARY OF THE INVENTION

In general systems of precipitate formation, the phenomenon is well-known that when the precipitant is introduced into a homogeneous solution, nuclei of precipitate are first formed and then precipitate aggregates gradually around the nuclei. This concept is also capable of being applied to the manufacture of artificial leather according to the above so-called coagulating process wherein a solution of synthetic polymer is introduced into a non-solvent and the polymer is precipitated and coagulated, although synthetic polymers used in the manufacture of synthetic leather material are generally based on an amorphous and flexible polymer. However, the present inventors have found that these flexible polymers are only difficultly sharply precipitated and are especially poor in their nucleation action. Therefore, in the case of employing flexible synthetic polymer, there results a non-homogeneous and relatively non-porous material or film unless an ingredient for accelerating the nucleation action is added. Thus there is merely obtained a material for leather having a low vapor- and air-permeability.

The present inventors have heretofore provided methods of producing homogeneous and highly porous material or film by previously adding an ingredient to act as homogeneous nuclei and thus causing flexible synthetic polymer to aggregate around the nuclei ingredient, thereby overcoming the above mentioned disadvantage. One method comprises, prior to coagulating, the incorporation previously of bacilliform or branch-form polymer particles of 5 to 500$\mu$ in size in synthetic polymer solution and at the same time the addition of a small quantity of a liquid that is a non-solvent for the synthetic polymer and the polymer particles, to prepare a substantially suspended solution for coating on a fibrous substrate, in order to accelerate the nucleation action. Another method comprises preparing a coating composition on a substrate wherein a solution of a rigid or semi-rigid polymer that is insoluble in the solvent for synthetic polymer is added to the synthetic polymer solution to form a size 5 to 50$\mu$ of rigid or semi-rigid polymer precipitate as a nucleating ingredient, by which the nucleation action is accelerated. It was indeed possible to form highly vapor-permeable films according to these methods. However, difficulties were experienced since synthetic polymer solutions in which the nuclei ingredients were dispersed, often exhibited dilatant behavior of viscosity. This is considered to be mainly due to the fact that the dispersed particles of the nuclei ingredient are large. Thenceforth as a result of intense investigation, it was found that the objects of the present invention can be more effectively accomplished by further developing the basis of the aforementioned concept. The present invention comprises employing, as the coating composition, a substantially suspended solution obtained by incorporating an inorganic compound as the nuclei ingredient having a particle size within the range of 40 m$\mu$ to 2$\mu$ and a liquid that is a non-solvent for the synthetic polymer and is miscible with the solvent for the synthetic polmyer, in a synthetic polymer solution, prior to coagulating.

Inorganic compounds used herein must be substantially insoluble in the synthetic polymer solution and, themselves, non-solvents for the synthetic polymer, and must be stable in the later steps of solvent extraction and drying.

Those materials beyond the range of 40m$\mu$ to 2$\mu$ in particle size, also have the nucleation action of the present invention but are not necessarily preferable in order to obtain a system exhibiting the best combination nucleation effect and excellent workability and a product of well-balanced properties. Namely, in the case where inorganic compounds or polymer particles above 2$\mu$ in size are employed, there is the disadvantage that it is difficult to treat uniformly since the solution exhibits a frequently dilatant behavior of viscosity as described above. It is like a muddy composition and the dependence of viscosity upon shear velocity is great in coating or impregnating treatments. On the other hand, where a compound below 40m$\mu$ in particle size, e.g., such as 15 to 25m$\mu$ of finely-divided anhydrous silicic acid, is employed as the nuclei ingredient, the contraction of the system after coagulation is extremely great and consequently, poor vapor- and air-permeable materials or films having a low degree of microporosity is formed. Therefore, materials having particle sizes between the above two extremes are employed in the present invention.

Among particularly preferred inorganic compounds as nuclei ingredient herein used, there may be mentioned for example precipitative light calcium carbonate, magnesium carbonate, fine particle clay, hydrous silicate and zinc oxide having a particle size of 40 m$\mu$ to 2$\mu$. By light calcium carbonate, is meant activated and surface-treated calcium carbonate both exhibiting a nearly equivalent effect.

Inorganic compounds as nuclei ingredient of the present invention may be generally employed in a weight ratio of 5 to 80 parts per 100 parts of synthetic polymer. Within this range, the higher amount of nuclei ingredient does not always produce the larger effect and so it is necessary to determine appropriate amounts for each system.

Synthetic polymer used herein is selected from the group comprising segmented polymers obtained by the reaction of substantially difunctional components having terminal primary amino groups and substantially difunctional polyalkylene ether, polyacetal or polyester segment components having terminal functional groups from the class consisting of isocyanate group, acid halogenide group, carbamic acid halogenide group and urea group, linear polyester polyurethanes and polyalkyleneether polyurethanes. As substantially difunctional component having terminal primary amino groups, there may be mentioned hydrazine, hydrazinehydrate, organic primary diamines such as ethylenediamine, tetramethylenediamine and metaxylylenediamine, and polyamides or polyurea oligomers which have primary amino groups on both ends and are of relatively low molecular weight.

Suitable solvents for these synthetic polymers may be selected from the group consisting of N,N-dimethyl formamide, N,N-dimethyl acetamide, dimethyl sulfoxide, formic acid, acetonitrile and tetrahydrofurane. Solvent mixtures comprising ketone, ester or ether and inorganic salt can also be usefully employed.

The concentration of the synthetic polymer solution employed in the present invention is preferably 7 to 30% by weight. The above synthetic polymer solution may be mixed with a methanol solution of polyamide in a range of 1/1 to 1/20 thereof based on solid content, if desired.

In the present invention, inorganic compounds having a particle size of 40 m$\mu$ to 2$\mu$ is homogeneously mixed and dispersed in the synthetic polymer solution as a nuclei ingredient prior to coagulation of the synthetic polymer. Mixing may be accomplished by homogenization with an ordinary batch type mixer. Since the compound may be dispersed by reagitation when it precipitates, this system may always be employed. In this case, the inorganic compound is preferably dried to an anhydrous state, but it may contain some quantity of humidity or crystalline water, provided that the range is negligible relative to the quantity of the liquid which is a non-solvent for the synthetic polymer.

In the present invention, it is essential to incorporate simultaneously the inorganic compound as the nuclei ingredient and the non-solvent liquid for the synthetic polymer in synthetic polymer solution. The quantity of this non-solvent liquid for the synthetic polymer added to its solution varies depending on the class of employable syntheetic polymer, solvent and non-solvent, but it is necessary to use an amount in the range of 20 to 80% of the quantity of non-solvent liquid required till substantial formation of precipitate just commences in the synthetic polymer solution selected (coagulation value). Below 20%, rapid precipitation and coagulation of synthetic polymer is not carried out even if the nuclei ingredient is present, and above 80% particularly above 100%, solutions exhibiting satisfactory behavior for impregnating or coating is not formed and so it is difficult to make microporous materials or films. "Coagulation value" herein denotes the weight percentage of non-solvent liquid in whole solvents of systems when non-solvent liquid is added till substantial precipitate yields in polymer solution. Based on the weight of the solvent employed, the amount of non-solvent liquid utilized may range from about 2 to about 6%, preferably less than 5% by weight.

Non-solvent liquids for synthetic polymers used herein include water, methanol, ethylene glycol, glycerine, etc. and they may be utilized as common non-solvent liquid for both complete coagulation of synthetic polymer solution coated or impregnated on a suitable substrate and in solvent extraction.

FiFbrous substrates used for impregnating or coating the composition obtained according to the present invention include a wide range of woven fabrics, nonwoven fabrics and papers. Particularly preferable examples are napped or piled woven fabrics and three-dimensionally interlaced non-woven mats obtained by needle-punching. In case of coating, fibrous substates treated with compositions containing the inorganic nuclei agents of the present invention, fibrous material obtained by impregnating the polymer emulsion and drying, may be suitably employed for the purposes of the present invention.

EXAMPLE 1

1.16 kg. (10 mols) of hexamethylenediamine and 0.3 kg. (5 mols) of urea are well mingled, dispersed uniformly into 2.0 kg. of water and their reaction is carried out at a temperature of 100° C. for 28 hours under a reduced pressure of 50 mm. Hg. in nitrogen current. The reaction product is filtered and washed sufficiently with warm water to yield a polyurea oligomer with terminal primary amino groups (mean molecular weight ca. 300).

Separately, a prepolymer containing 6.12% of unreacted isocyanate groups is prepared by reacting 5.0 kg. (5 mols) of polyethylene glycol with molecular weight 1000 and 1.75 kg. (10 mols) of 2,4-tolylene diisocyanate at 80° C. for 90 minutes. To 0.5 kg. (1.65 mols) of polyurea oligomer dissolved in 4.5 kg. of N,N-dimethyl formamide, is added 2.25 kg. (1.65 mols) of isocyanate terminated prepolymer to react at 100° C. for 10 hours. Upon completion of the reaction the polymer concentration is adjusted to 7.0% by the further addition of N,N-dimethyl formamide. The coagulation value of the polymer solution thus obtained to water is 8.5%.

To the polyurea elastomer solution thus obtained, is added nuclei ingredient of 20% by weight on the basis of solid content and at the same time, is added with stirring a weight ratio 50:50 of mixture of water and N,N-dimethylformamide in an amount as described in Table 1. The additive amount of mixture comprising equivalent weight ratio of water and N,N-dimethyl formamide corresponding to the coagulation value is calculated at 19 g. to 100 g. of a 7.0% polyurea elastomer solution, since the coagulation value of the polymer solution employed is 8.5% as described above. Vinylon-mixed flannel which is composed of vinylon 30% and rayon 70% in both warp and woof and is raised both sides of plain weave cloth having texture of warp 20$^s$ x 50/inch and woof 20$^{s/2}$ x 48/inch, is impregnated with the polyurea elastomer solution composition thus obtained in a weight of 200 g./m.$^2$.

The impregnation treatment is carried out as follows: Vinylon mixed flannel is impregnated wth polyurea elastomer compostion, immediately immersed into water at 30 to 35° C. to coagulate the polymer sufficiently (for 4 minutes), then washed well in warm water at 70 to 80° C., washing liquid wrung out, and thereafter allowed to dry at 100° C. for 30 minutes.

The properties of polyurea composition-impregnated sheet thus produced are described in Table 1.

TABLE 1.—COMPOUNDING OF POLYUREA COMPOSITION

| | | | | | |
|---|---|---|---|---|---|
| Class of inorganic compound (nuclei ingredient) | (1) | (1) | (2) | (3) | (4) |
| Particle size of inorganic compound, $\mu$ | 0.7–1.0 | 0.7–1.0 | 0.5–2.0 | 0.2–0.3 | (5) |
| Used amount of water/DMF (50:50) mixture (g./100 g. 7% polymer solvent) | 11.5 | 7.5 | 11.5 | 11.5 | 11.5 |
| Percent water-based on solvent | 5.8 | 3.9 | 5.8 | 5.8 | 5.8 |
| Properties of Polyurea Composition Impregnated Sheet | | | | | |
| Amount of composition bound (g. solid/m.$^2$) | 106 | 120 | 128 | 106 | 111 | 102 |
| Vapor permeability (g. water/m.$^2$, 24 hrs. at 40° C.) | 1,120 | 3,200 | 2,600 | 2,000 | 2,400 | 860 |
| Water permeability (min./100 g. permeated water) | 460 | 120 | 120 | 103 | 180 | 650 |

[1] Light CaCO$_3$.  [2] MgCO$_3$.  [3] CaSiO$_3$.  [4] Finely divided SiO$_2$.  [5] 15–25 m$\mu$.

NOTE.—DMF, N,N-dimethyl formamide, vapor permeability, measured according as was defined in JIS Z 208 (Vapor permeability test method of dampproof material); water permeability, time is measured with freeness tester for pulp-like material while 100 g. of water is permeated through sample of 1 cm.$^2$. But water level is constantly held at 15 cm. when measured.

EXAMPLE 2

5.0 kg. (5.0 mols) of polypropylene glycol having a molecular weight of 1,000 is heated to 50° C., to this is added 2.5 kg. (10.0 mols) of melted diphenylmethane-4,4'-diisocyanate and the reaction is carried out for 1.5 hours under dry air stream, at 80° C. with vigorously stirring. Isocyanate-terminated prepolymer containing 5.32% of free isocyanate groups is produced. After being cooled at 30° C., this is dissolved uniformly in 11.2 kg. N,N-dimethyl formamide (water content 0.08%) and then, to the solution cooled to 22° C., a chain-extender mixture of 260 g. of hydrazine hydrate (4.3 mols) and 39 g. of di-n-butylamine (0.3 mol) dissolved in 3.0 kg. of N,N-dimethyl formamide is added over a period of 10 minutes under water cooling. The reaction is further carried out at 30 to 33° C. for 2 hours and there is obtained a 13.0% polyurea elastomer solution having a viscosity of 163 cps. at 25° C. by diluting with 37.2 kg. of N,N-dimethyl formamide. The coagulation value of this solution to water is 8.3%. To the polyurea elastomer solution thus obtained, there is incorporated N,N-dimethyl formamide, water and inorganic compound in proper amounts to prepare a solution composition as in Table 2, which is employed for the impregnating treatment of non-woven fabric. The non-woven fabric herein used is produced by making a carded web of 6-nylon staples with 3 deniers and 29 mm. length and needle-punching it with needle-loom 230 times/cm.$^2$. The needled-web has 1.3 mm. thickness and 260 g./m.$^2$ weight. This non-woven fabric is immersed in the solution having the composition as described in Table 2 for one minute so as to absorb about 2.5 kg. solution/m.$^2$ fabric, wrung out and immediately immersed in water at 25 to 30° C. for 4 minutes to coagulate polymer composition, followed by wringing. Then, the solvent is substantially completely extracted by bathing in warm water of 70 to 80° C. for 30 minutes, and the sheet is squeezed and thereafter dried for an hour at 90 to 100° C.

The properties of the polyurea composition-impregnated sheet thus produced are shown in Table 2.

TABLE 2.—COMPOUNDING OF POLYUREA COMPOSITION

| | | | | | |
|---|---|---|---|---|---|
| Polyurea elastomer solid content ratio | 100 | 80 | 60 | 80 | 60 |
| Light calcium carbonate solid content ratio | | 20 | 40 | | |
| Magnesium carbonate, solid content ratio | | | | 20 | 40 |
| Polymer concentration (percent) | 10.0 | 10.0 | 10.0 | 10.0 | 10.0 |
| Water content (based on amount of solvent) (percent) | | 4.2 | 4.4 | 4.2 | 4.4 |
| Viscosity (cps. at 25° C.) | 98 | 112 | 146 | 108 | 132 |
| Properties of Polyurea Composition Impregnated Sheet | | | | | |
| Thickness (mm.) | 1.45 | 1.51 | 1.48 | 1.56 | 1.55 |
| Weight (g./m.$^2$) | 505 | 535 | 550 | 528 | 545 |
| Amount of composition bound (g. solid/m.$^2$) | 245 | 275 | 290 | 268 | 285 |
| Vapor-permeability (g./m.$^2$, 24 hrs. at 40° C.) | 1,460 | 2,800 | 3,100 | 2,400 | 2,950 |
| Water-permeability (min./100 g. permeated water) | 48 | 18 | 12 | 25 | 19 |
| Gurley's stiffness (mg.) | 860 | 630 | 960 | 590 | 860 |

Particle sizes of light calcium carbonate and magnesium carbonate employed were 0.7 to 1.0$\mu$ and 0.5 to 2.0$\mu$, respectively. The employment of inorganic nuclei agent and water (43% to coagulation value) as in the present invention brings about sheet materials of remarkably increased vapor-permeability. Flexibility increases to the optimum point because there is little adhesion between the polymer and fiber and when 40% by weight (based on whole solid content) of inorganic compound is added, it conversely decreases because the hardness of polymer composition itself increases, but the shape of the sheet material is more preferable.

EXAMPLE 3

To 1.3 kg. (1.0 mol) of polytetramethylene glycol with a molecular weight of 1,300 heated to 50° C. to melt, there is added 0.5 kg. (2.0 mols) of melted diphenylmethane-4,4'-diisocyanate and the reaction is conducted at 70° C. for 1.5 hours to convert the mixture into a isocyanate-terminated prepolymer containing 4.48% of free isocyanate groups. 1.8% kg. (1.0 mol) of this prepolymer and 1.5 kg. (1.0 mol) of prepolymer prepared in a similar manner as Example 2 are mixed together and further dissolved homogeneously in 4.6 kg. of N,N-dimethyl formamide at 22 to 25° C. for a period of 30 minutes. To this is added with stirring a mixture of 133 g. of 1,2-propylenediamine (1.8 mols), 17 g. of di-n-butylamine (0.13 mol) and 1.5 kg. of N,N-dimethyl formamide for 15 minutes, and after the lapse of 30 minutes, 6.6 kg. of additional N,N-dimethyl formamide is further mixed homogeneously with stirring to prepare a 30% polyurea elastomer solution. The intrinsic viscosity of this polyurea elastomer is 0.68 (in DMF). The above 30% of solution of polyurea elastomer has a viscosity of 43,000 cps. at 25° C. and coagulation value of 6.8% to water.

A solution having the composition as in Table 3 is prepared by incorporating additional N,N-dimethyl formamide, water and inorganic compound in proper amounts in the N,N-dimethyl formamide solution of polyurea elastomer thus obtained, and is employed for coating on the impregnated non-woven fabric sheet material wherein non-woven fabric is impregnated with the composition compounded by polyurea alone in Example 2, to make leather-like material.

The impregnated non-woven fabric sheet material used herein is buffed on its coating face, prior to the coating treatment and is adjusted to have a 5% of water content.

The polyurea elastomer coating composition is previously defoamed for 30 minutes under reduced pressure of 10 mm. Hg.

Thus, leather-like material is produced by a process wherein the above coating composition is spread on the sheet material to 1.7 mm. thickness, the resulted material is exposed in an atmosphere of relative humidity 43 to 52% for 7 minutes, immersed in water at 30 to 35° C. for 10 minutes to coagulate the polymer, further immersed in warm water at 80 to 90° C. for 2 hours to extract substantially completely the solvent, wrung out and dried at 90 to 100° C. for an hour.

The properties of the leather-like material thus obtained are tested and the results are shown in Table 3.

TABLE 3.—COMPOUNDING OF POLYUREA COMPOSITION
[Parts by weight]

| | | | | | | | | |
|---|---|---|---|---|---|---|---|---|
| 30% polymer solution | 100 | 159 | 141 | 104 | 116 | 100 | 120 | 173 | 142 |
| Light calcium carbonate | | 12.0 | 21.5 | 23.5 | 17.5 | | | | |
| Zinc oxide | | | | | | 30.0 | 36.0 | | |
| Fine particle silicic acid anhydride | | | | | | | | 15.0 | 12.5 |
| Mixture of DMF/water (5/1) | | 57.0 | 56.0 | 49.0 | 49.5 | 64.0 | 51.5 | 48.0 | 60.5 |
| N,N-dimethyl formamide | 100 | 22.0 | 32.5 | 73.5 | 67.0 | 78.5 | 69.5 | 14.0 | 35.0 |
| Percent water based on solvent | | 5.2 | 5.2 | 4.3 | 4.3 | 5.0 | 4.3 | 4.5 | 5.4 |

Properties of Polyurea Coating Composition

| | | | | | | | | |
|---|---|---|---|---|---|---|---|---|
| Polyurea concentration percent | 15 | 22 | 22 | 18 | 18 | 20 | 20 | 20 | 20 |
| Concentration of inorganic nuclei agent (percent volume) | 0 | 7 | 14 | 21 | 14 | 14 | 14 | 14 | 14 |
| Viscosit character: | | | | | | | | | |
| $\eta_4$ (cps.) | 650 | 8,500 | 600 | 1,000 | 4,000 | 700 | 4,100 | 23,600 | 6,600 |
| $\eta_{20}$ (cps.) | 860 | 11,100 | 3,500 | 3,700 | 8,100 | 900 | 5,700 | 30,200 | 9,200 |
| $(\eta_{20}-\eta_4)\eta_4$ | 0.13 | 0.31 | 4.83 | 22.09 | 1.02 | 0.29 | 0.34 | 0.28 | 0.29 |

Properties of Coated Non-Woven Fabric Sheet Material

| | | | | | | | | |
|---|---|---|---|---|---|---|---|---|
| Area shrinkage of coating later (percent) | 18.3 | 5.9 | 5.9 | 5.0 | 4.0 | 5.9 | 4.0 | 11.7 | 7.8 |
| Thickness of coating layer (mm.) | 0.32 | 0.74 | 0.68 | 0.85 | 0.75 | 0.53 | 0.75 | 0.66 | 0.6 |
| Specific gravity of coating layer | 0.86 | 0.54 | 0.55 | 0.33 | 0.40 | 0.45 | 0.36 | 0.46 | 0.43 |
| Void percentage of coating layer (percent) | 29 | 60 | 59 | 73 | 70 | 59 | 67 | 58 | 61 |
| Vapor permeability (g. water/m.² hrs.) | 135 | 1,095 | 1,105 | 1,010 | 1,400 | 1,090 | 1,340 | 512 | 918 |
| Scott crumble resistance (frequency) | 30,000 | 50,000 | 30,000 | 30,000 | 30,000 | 30,000 | 50,000 | 30,000 | 30,000 |

Table remarks.—As regards the viscosity characteristic, dependence of viscosity upon shearing velocity is evaluated by varying shearing velocity with #5 rotor of BH type viscometer (Brookfield viscometer), wherein $\eta_4$ and $\eta_{20}$ designate apparent viscosity (cps. at 25° C.) at rotoring speed of 4 r.p.m. and 20 r.p.m., respectively and $(\eta_{20}-\eta_4)/\eta_4$ is positive and the less, coating performance is estimated the better.

Scott crumble resistance was determined according to JIS K–6772 and was represented in frequency crumbled without any surface change as crack. Void percentage of coating layer means so-called porosity and is represented by [100−$\eta$ apparent specific gravity of coating layer/ specific gravity of coating composition) ×100].

Inorganic nuclei agent, light calcium carbonate PC has a particle size of 0.8 to 1.3 (specific gravity 2.8), zinc oxide has a particle size of 0.5 to 0.8$\mu$ (specific gravity 5.6) and both are adaptable for objects of the present invention, but finely-divided silicic acid anhydride ("aerosin") having a particle size of 0.02 to 0.03$\mu$ (specific gravity 1.95) is not considered to be preferable due to great contraction in the coagulated film.

EXAMPLE 4

In a 20% N,N-dimethyl formamide solution of polyurea elastomer prepared in a similar manner as in Example 3, a 20% methanol solution of 6 nylon-6,6 nylon copolymer (Teramine CM–4000 manufactured by Toyo Rayon Co. Ltd.), water and light calcium carbonate are incorporated in proper amounts to prepare compositions as in Table 4. Here, the 20% N,N-dimethyl formamide solution as polyurea elastomer employed has a viscosity of 52,000 cps., at 18° C. and coagulation value of 6.7% to water.

The solution composition thus prepared is treated to coat on the same impregnated non-woven fabric sheet material as in Example 3. The method and condition of coating treatment are the same as described in Example 3. The leather-like material thus obtained is tested as to its properties and the results are shown in Table 4.

TABLE 4.—COMPOUNDING OF POLYUREA COMPOSITION
[Parts by weight]

| | | | | |
|---|---|---|---|---|
| 20% polyurea elastomer solution | 400 | 400 | 400 | 400 |
| 20% copolymerized nylon solution | 100 | 100 | 75 | 50 |
| Water | 10 | 10 | 10 | 10 |
| Percent of total nonsolvent liquid based on solvent | 2.5 | 2.5 | 2.6 | 2.7 |
| Light calcium carbonate | 10 | 20 | 20 | 30 |
| Viscosity of composition (cps. at 25° C.) | 20,000 | 20,000 | 23,000 | 23,000 |

Properties of Coated Non-Woven Fabric Sheet Material

| | | | | |
|---|---|---|---|---|
| Area shrinkage of coating layer (percent) | 6.8 | 6.2 | 6.5 | 7.1 |
| Thickness of coating layer (mm.) | 0.73 | 0.69 | 0.75 | 0.70 |
| Specific gravity of coating layer | 0.58 | 0.57 | 0.51 | 0.63 |
| Vapor permeability (g. water/ m.², 24 hrs.) | 934 | 988 | 932 | 832 |
| Scott crumble resistance (frequency) | >38,000 | >38,000 | >38,000 | >38,000 |

In this example, a polyurea elastomer composition solution is employed, mixing with a methanol solution of nylon, wherein methanol also acts as a non-solvent for the polyurea elastomer like water. But it is proved experimentally that the efficiency as a non-solvent of methanol is 1/7.5 of that of water.

EXAMPLE 5

A hydroxyl-terminated polyester is produced by reacting 90 g. of 1,4-butylene glycol (1.0 mol) and 1210 g. of ε-caprolactone (10.6 mols) in the presence of 1.3 g. of tetrabutyl titanate as catalyst at 150° C. for 4 hours. After the reaction is finished, the reacted mass is retained at 150° C. under reduced pressure of 30 mm. Hg for 20 hours, adding 3 g. of water to deactivate the catalyst, and unreacted monomers and water are removed, resulting in 1,240 g. of polyester (molecular weight 1,310). 650 g. (0.5 mol) of this polyester glycol and 90 g. (1.0 mol) of 1,4-butylene glycol are mixed together and dehydrated under 30 to 40 mm. Hg of reduced pressure at 150° C. for an hour.

The mixture is cooled to 50° C. and to this is added with vigorous stirring 395 g. of melted diphenylmethane-4,4'-diisocyanate (1.58 mols). After the temperature is raised to 100° C. and the viscosity increases (about 4 minutes), the mass is poured into an aluminum pan and vulcanized at 100° C. for 22 hours. The resulting massive polyurethane is crushed with roll, 80 g. of which is dissolved uniformly into 320 g. of N,N-dimethyl formamide with stirring to prepare 400 g. of a 20% solution.

A homogeneous coating solution was prepared by adding slowly a mixture of 40 g. of light-calcium carbonate 15.5 g. of water and 24.5 g. of N,N-dimethyl formamide to this solution with stirring. The 20% N,N-dimethyl formamide solution of polyurethane elastomer showed a viscosity of 2,000 cps. at 35° C. and a coagulation value of 6.3% to water. Therefore, the above added amount of water corresponds to 5.15% by weight of the whole solvent mixture and 79% of the coagulation value.

This coating solution is defoamed under reduced pressure of 10 mm. Hg for 30 minutes, spread on the impregnated non-woven fabric sheet material as in Example 3 to 1.7 mm. thickness, then the coated material is immediately immersed into water at 25 to 30° C. for 5 minutes, dried at 80 to 90° C. for 1.5 hours, buffed on inverse face to the coated face, and thereafter squeezed between embossing rolls at ca. 135° C. of their surface temperatures to emboss the coating face.

Coating the acrylic emulsion for leather (manufactured by Toa Paint Co., Ltd.) on this surface and further spraying a lacquer containing 6% nitrocellulose, followed by drying there is obtained a leather material of feeling (touch) resembling closely natural leather.

This product has a thickness of 1.68 mm., weight of 825 g./m.$^2$, coating thickness of 0.62 mm. and a specific gravity of 0.48. It exhibits flexible feeling in bending and has 960 mg. of Gurley's stiffness. Vapor permeability is 1,360 g. H$_2$O/m.$^2$. 24 hrs. at 40° C. and water does not leak under the pressure of 1 m. water pillar after 30 minutes. Scott crumble resistance is over 100,000 frequencies. Linear setting percentage after 30 minutes since it was set for 30 minutes at 10% elongation, is 56% in warp of the substrate and 49% in woof of the substrate, respectively at 25° C.

In manufacturing shoes, this material could be treated in the similar manner as natural leather.

We claim:
1. A method of preparing synthetic leather which comprises:
   (a) dissolving a polyurethane-urea polymer in a suitable solvent to prepare a polyurethane-urea solution;
   (b) simultaneously adding to the polyurethane-urea solution
      (i) 5–80%, based on the weight of the polymer, of a member selected from the group consisting of light calcium carbonate, magnesium carbonate, hydrous silicate and zinc oxide having a particle size of about 40 m$\mu$–2$\mu$ and being substantially insoluble in the solvent and the miscible liquid of (ii), and
      (ii) a liquid miscible with the solvent, the polymer being substantially insoluble in the miscible liquid, the miscible liquid being added in an amount of from 2 to about 6% of the amount of said solvent;
   (c) impregnating or coating a fibrous substrate with the resultant mixture;
   (d) immersing the impregnated or coated fibrous substrate in the miscible liquid to coagulate the polymer; and
   (e) extracting substantially all the solvent and miscible liquid from the resultant product.

2. A method as in claim 1, wherein the polyurethane-urea polymer is obtained by reacting a substantially difunctional component having terminal primary amino groups with a member selected from the group consisting of a substantially difunctional polyalkylene ether, polyacetal, and polyester, each having terminal functional groups consisting of isocyanate, acid halogenide, carbamic acid halogenide and urea groups, linear polyester polyurethane and polyalkylene ether polyurethane.

3. A process as in claim 1, wherein the solvent is selected from the group consisting of N,N-dimethyl formamide, N,N-dimethyl acetamide, dimethyl sulfoxide, formic acid, acetonitrile and tetrahydrofurane.

4. A process as in claim 1, wherein the miscible liquid is selected from the group consisting of water, methanol, ethylene glycol and glycerine.

5. A process according to claim 2, wherein the substantially difunctional component having terminal primary amino groups is selected from the group consisting of hydrazine, hydrazine hydrate, ethylenediamine, tetramethylenediamine, metaxylylenediamine, polyamide oligomer and polyurea oligomer.

6. A process according to claim 2, wherein the polyurethane-urea polymer is mixed with polyamide in a weight ratio of from 1/20 to 1/1.

7. A process according to claim 6, wherein the solvent for polyamide is methanol.

8. A product produced according to the method of claim 1.

References Cited
UNITED STATES PATENTS

| | | | |
|---|---|---|---|
| 2,871,226 | 1/1959 | McShane | 260—858 |
| 3,067,483 | 12/1962 | Hollowell | 117—140 |
| 3,100,721 | 8/1963 | Holden | 117—135.5 |
| 3,322,568 | 5/1967 | Golodner | 117—135.5 |
| 3,360,394 | 12/1967 | Griffin et al. | 117—63 |
| 3,369,925 | 2/1968 | Matsushita et al. | 117—63 |

WILLIAM D. MARTIN, Primary Examiner

T. G. DAVIS, Assistant Examiner

U.S. Cl. X.R.

117—135.5, 161